United States Patent [19]

Cox

[11] 3,854,436

[45] Dec. 17, 1974

[54] MOTORCYCLE BOAT

[76] Inventor: Oscar Leon Cox, 3856 Castleman, Riverside, Calif. 92503

[22] Filed: Oct. 23, 1973

[21] Appl. No.: 408,544

[52] U.S. Cl.............................................. 115/.5 A
[51] Int. Cl............................................ B63h 25/00
[58] Field of Search............................ 115/.5 A, 1 R

[56] References Cited
UNITED STATES PATENTS
2,997,012  8/1961  Özkök............................... 115/.5 A FOREIGN PATENTS OR APPLICATIONS
339,524   8/1959  Switzerland....................... 115/.5 A
460,828  12/1950  Italy.................................. 115/.5 A
589,177   2/1959  Italy.................................. 115/.5 A Primary Examiner—George E. A. Halvosa
Assistant Examiner—Gregory W. O'Connor

[57] ABSTRACT

Motorcycle boat has flotation, propulsion, and steering components and is arranged to demountably receive a motorcycle. The motorcycle is positioned and demountably secured on the boat in such a manner that the propulsive power of the motorcycle turns the propulsive equipment of the motorcycle boat, and the steering of the motorcycle controls the steering components of the boat.

3 Claims, 2 Drawing Figures

PATENTED DEC 17 1974

3,854,436

MOTORCYCLE BOAT

BACKGROUND

This invention is directed to a boat particularly arranged to carry a motorcycle which supplies the power and is connected to the guidance means of the boat.

Boating is an ancient form of human transportation. The prior art includes many types of boats, each employing a different character of propulsive effort. Since the advent of engine-type machinery, various styles of engines have been permanently incorporated into a boat structure for propulsion thereof. Furthermore, a completely separate art of demountable, clamp-on engines has been developed for small boats. These outboard motors are now highly developed and they are particularly arranged and specially suited for that task. They have little other capability. In the field of boating, propulsion engines have developed upon highly specialized lines and do not have substantial additional utility.

SUMMARY

In order to aid in the understanding of this invention, it can be stated in essentially summary form that it is directed to a motorcycle boat. The boat is particularly designed to demountably receive a motorcycle and is constructed so that propulsive power of the motorcycle causes operation of the propulsive means of the boat, and steering of the motorcycle is connected to cause operation of the steering means on the boat.

It is thus an object of this invention to provide a boat which can demountably receive a motorcycle so that those people owning motorcycles can enjoy the sport of boating without the need for purchasing additional, duplicative propulsive machinery. Other objects and advantages of this invention will become apparent from a study of the following portion of the specification, the claims, and the attached drawings.

DESCRIPTION OF THE PREFERRED EMBODIMENT

Figure 1:
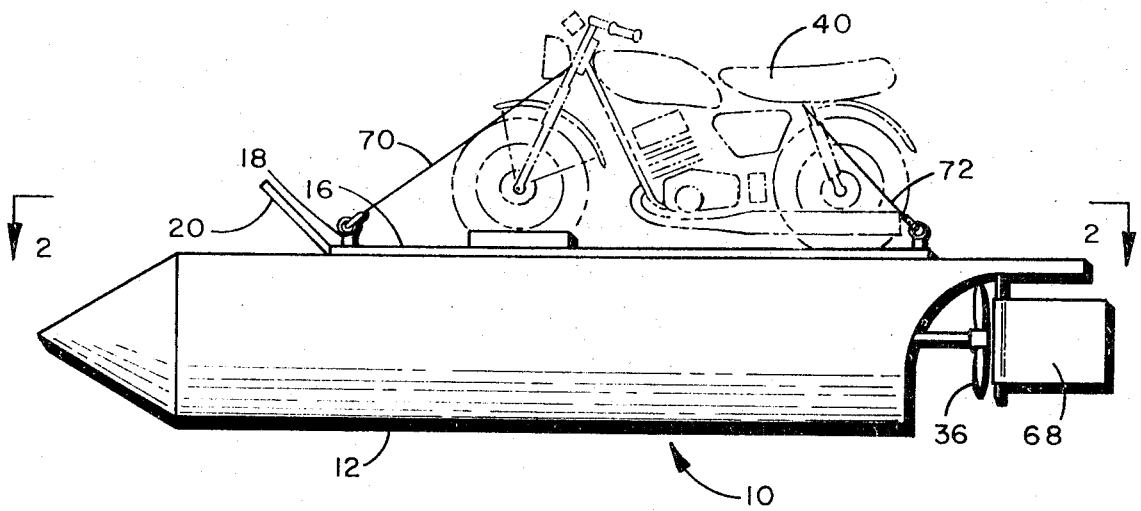
FIG. 1 is a side-elevational view of the motorcycle boat of this invention, with a motorcycle illustrated in dashed lines to show its relative mounting position thereof.
Figure 2:
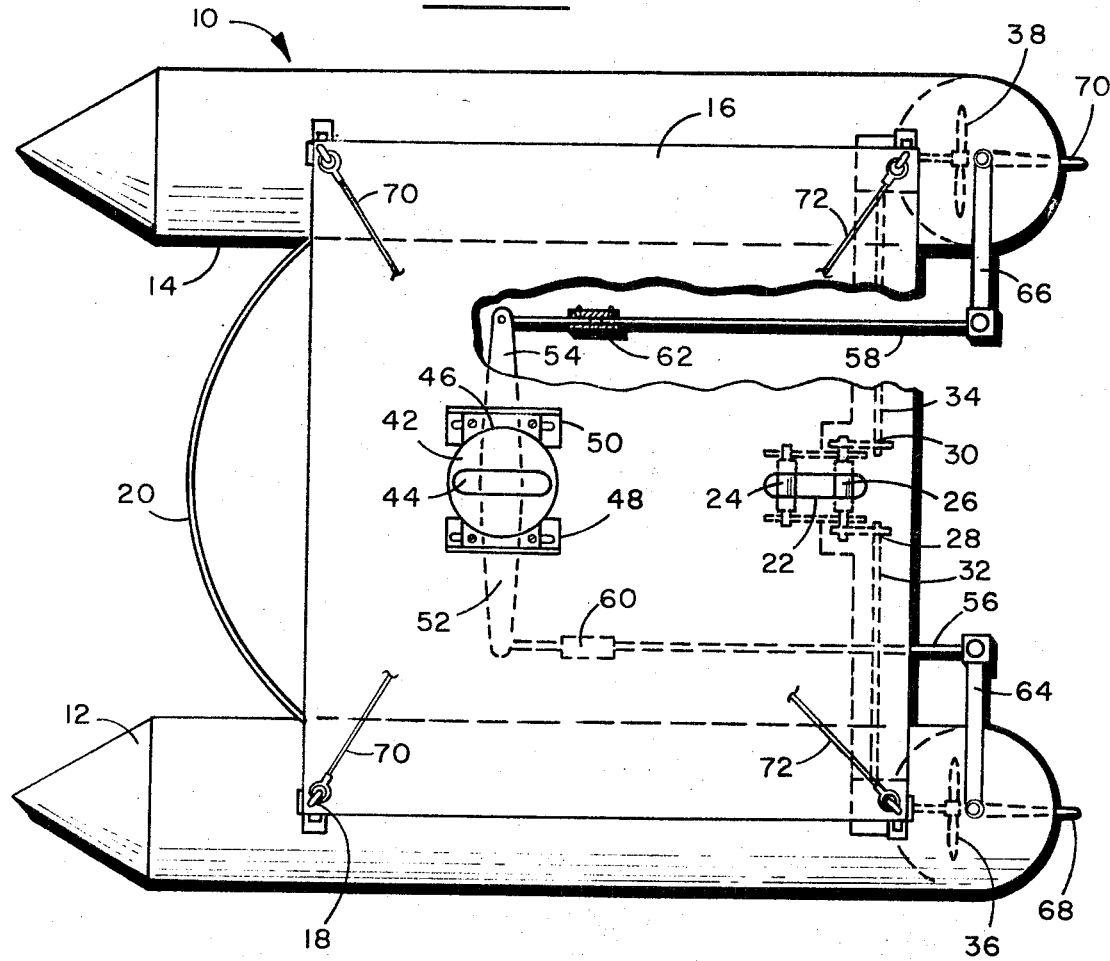
FIG. 2 is a top-plan view of the motorcycle boat, as seen generally along the line 2—2 of FIG. 1, with parts broken away.

The motorcycle boat of this invention is generally indicated at 10. The boat comprises flotation means, preferably first and second pontoons 12 and 14. The pontoons are of sufficient length and sufficient volume and are spaced an appropiate distance apart to provide flotation stability of the boat 10. The pontoons are secured relative to each other by means of a deck 16. The securement means 18 by which the desk is secured at each of its corners to the pontoons may be of such construction that convenient demountability is practical so that the boat can be disassembled into three parts, comprising the deck and the two pontoons. This would aid in its transportation and storage out of the water. While in the water, the three major structural parts are preferably fairly rigidly secured together so that they are mutually cooperative in forming a seaworthy boat. The front of the deck has a splashguard 20 turned up to protect the deck and anything thereon from water splash.

Slot 22 is positioned substantially on the longitudinal center line of the boat in the deck adjacent the rear edge thereof. Slot 22 is mounted at its front by idler roller 24 and at its rear by power roller 26. Power roller 26 is connected by drive gears 28 and 30 to transverse power shafts 32 and 34. The power shafts are connected by conventional bevel gears, spur gears, and shafts to respectively drive propellers 36 and 38. Conveniently, the propellers are contra-rotating to balance steering torques.

Motorcycle 40, shown in dotted lines in FIG. 1 to emphasize its demountability and to indicate its utility as an accessory to the motorcycle boat 10, has its rear wheel positioned in slot 22 and against rollers 24 and 26. Now, when the motorcycle rear wheel is rotated by means of power from the motorcycle engine, propellers 36 and 38 rotate to propel boat 10.

Turntable 42 has a slot 44 therein and is positioned to rotate on a vertical axis substantially on the longitudinal center line of boat 10. Turntable 42 is rotatable on platform 46. Platform 46 is, in turn, mounted for adjustable motion along the longitudinal center line on brackets 48 and 50. These brackets are, in turn, secured to deck 16. When the motorcycle 40 is placed with its rear wheel in slot 22, the longitudinal position of turntable 42 is adjusted to the motorcycle wheel base. Thereupon, platform 46 is secured in place. It is seen that, by turning the front fork of the motorcycle, turntable 42 rotates upon its vertical axis.

Beneath deck 16, steering yokes 52 and 54 are secured to rotate with turntable 42. Steering rods 56 and 58 are respectively secured to steering yokes 52 and 54 through adjustment collars 60 and 62 which provide for the necessary steering adjustment for motorcycle wheel base adjustment. At their ends, the steering rods are respectively pivotally attached to steering arms 64 and 66. These arms are respectively secured to the steering posts with rudders 68 and 70 secured to the lower ends of these steering posts. It is thus seen that manipulation of the handlebars of the motorcycle causes rotation of the front fork thereof, and this is coupled through the steering mechanism of the boat to cause rudder motion. When the motorcycle 40 is secured in place with its wheels in their respective slots and with appropriate holddown ties 70 and 72, a person astride the motorcycle can control this propulsive effort by control of the motorcycle engine and can control his direction by manipulation of the motorcycle handlebars.

In use, the boat is put into the water, and the motorcycle is mounted thereon. The motorcycle can be removed and replaced conveniently and at will, because there are no connections to the cycle, other than the securing holddown ties. Thus, dual utility is provided for the motorcycle.

If desired, the boat can be removed from the water in one piece or can be demounted and removed in three pieces, after the motorcycle is removed therefrom. Any convenient structural material is suitable, but fiberglass pontoon hulls would appear to be the most satisfactory material of those that are chosen today for such applications. The deck could be of reinforced fibreglass construction with suitable trussing to accomodate the weight of the motorcycle and its rider. Otherwise, a metallic deck with tubular supporting structure would also be a suitable deck construction.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A catamaran boat for use in combination with an engine-driven motorcycle which has a single ground-engaging drive wheel rotated by engine power and which has a single ground-engaging wheel movable on a substantially vertical axis for steering of the motorcycle, said boat comprising:

two spaced catamaran hulls and a deck attached to said hulls for providing buoyancy and stability to said boat and to the motorcycle mounted on said boat and to an operator of the motorcycle;

a power roller and another roller mounted on said platform for engagement by the ground-engaging wheel of the motorcycle, first and second propellers mounted for rotation on axes extending generally longitudinally of said boat, one of said propellers being associated with each one of said hulls at the aft end thereof and positioned so that a substantial portion of said propellers is submerged when said boat is floating, drive means interconnecting said power roller and said propellers for rotating said propellers when said power roller is rotated;

a turntable mounted on said platform for engagement by the steerable wheel on the motorcycle, a rudder mounted at the rear of each of said hulls on said boat respectively positioned aft of said propellers on said hulls and positioned to be substantially submerged when said boat is floating to steer said boat, the steering yoke secured to each side of said turntable and extending laterally therefrom in opposite directions, steering rods pivotally connected to the outer ends of said steering yoke, steering arms respectively secured to said udders and being attached to said steering rods so that rotation of said turntable causes rotation of both of said rudders in the same direction so that steering of the steerable wheel on the motorcycle causes rotation of said turntable and change in direction of said rudder for directing said boat as it moves through the water.

2. The boat of claim 1 wherein said power roller is positioned beneath said deck and further including a slot in said deck adjacent said power roller so that the drive wheel can extend through said slot in said deck and engage said power roller.

3. The boat of claim 2 wherein said turntable is adjustably mounted on said deck so that said turntable can be moved fore and aft for adjustment, in accordance with the wheel base of the motorcycle to be employed therewith.

* * * * *